United States Patent
Kang et al.

(10) Patent No.: US 8,620,395 B2
(45) Date of Patent: Dec. 31, 2013

(54) MOBILE TERMINAL

(75) Inventors: Jaehyuk Kang, Gyeonggi-Do (KR); Inseok Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 12/819,817

(22) Filed: Jun. 21, 2010

(65) Prior Publication Data

US 2011/0053666 A1 Mar. 3, 2011

(30) Foreign Application Priority Data

Aug. 27, 2009 (KR) .................. 10-2009-0079963

(51) Int. Cl.
*H04M 1/00* (2006.01)
*H01J 7/00* (2006.01)
*H01J 15/00* (2006.01)
*H02G 3/08* (2006.01)
*H05K 5/00* (2006.01)

(52) U.S. Cl.
USPC .......... 455/575.1; 361/752; 174/50; 174/520; 174/50.6

(58) Field of Classification Search
USPC ................ 455/575.1–9, 128, 347; 340/573.4, 340/568.2, 539.31; 310/339, 318
See application file for complete search history.

(56) References Cited

U.S. PATENT DOCUMENTS

| | | | | |
|---|---|---|---|---|
| 2,774,812 | A * | 12/1956 | Clark .................... | 174/153 R |
| 3,040,514 | A * | 6/1962 | Dinstman ............... | 368/289 |
| 4,632,269 | A * | 12/1986 | Rose ..................... | 220/3.8 |
| 6,217,339 | B1* | 4/2001 | Tsubata .................. | 439/38 |
| 6,853,304 | B2* | 2/2005 | Reisman et al. ......... | 340/573.4 |
| 7,471,060 | B2* | 12/2008 | Raghunath et al. ...... | 320/107 |
| 7,755,258 | B2* | 7/2010 | Xue ....................... | 310/339 |
| 2001/0046808 | A1* | 11/2001 | Jorgensen et al. ....... | 439/587 |
| 2005/0107137 | A1* | 5/2005 | Byun et al. ............. | 455/575.1 |
| 2006/0030381 | A1* | 2/2006 | Byun et al. ............. | 455/575.4 |
| 2009/0156255 | A1* | 6/2009 | Shin et al. .............. | 455/558 |
| 2009/0163249 | A1* | 6/2009 | Seo et al. ............... | 455/566 |
| 2009/0191927 | A1* | 7/2009 | Hong .................... | 455/575.8 |
| 2011/0002106 | A1* | 1/2011 | Bentley et al. ......... | 361/752 |

* cited by examiner

*Primary Examiner* — Kent Chang
*Assistant Examiner* — William Lu
(74) *Attorney, Agent, or Firm* — Birch, Stewart, Kolasch & Birch, LLP

(57) ABSTRACT

A mobile terminal comprises: a case forming appearance of the mobile terminal, and having a printed circuit board (PCB) therein; and a connection terminal mounted to the case, and configured to electrically connect the PCB to an external device, wherein the connection terminal comprises: an external terminal supported by an outer surface of the case; and an internal terminal elastically contacting a terminal of the PCB, connected to the external terminal, and supported by an inner surface of the case.

18 Claims, 6 Drawing Sheets

MOBILE TERMINAL

CROSS-REFERENCE TO A RELATED APPLICATION

Pursuant to 35 U.S.C. §119(a), this application claims the benefit of earlier filing date and right of priority to Korean Application No. 10-2009-0079963, filed on Aug. 27, 2009, the content of which is incorporated by reference herein in its entirety.

BACKGROUND OF THE INVENTION

1. Field of the Invention

The present invention relates to a mobile terminal, and particularly, to a mobile terminal having connection terminals for electrical connection with an external device.

2. Background of the Invention

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, the multimedia player requires sufficient support in terms of hardware or software, for which numerous attempts are being made and implemented. For example, a user interface allowing users to easily and conveniently search for and select one or more functions is provided.

As the mobile terminal is regarded as personal belongings to express a user's personality, various designs are required.

Generally, the mobile terminal is provided with connection terminals for electrical connection with an external device. Various attempts for implementing connection terminals having more enhanced reliability are actively ongoing.

SUMMARY OF THE INVENTION

Therefore, an object of the present invention is to provide a mobile terminal capable of enhancing reliability by stably and electrically connecting a connection terminal thereof to a charging apparatus, and by performing stable coupling between the connection terminal to a case of the mobile terminal.

To achieve these and other advantages and in accordance with the purpose of the present invention, as embodied and broadly described herein, there is provided a mobile terminal, comprising: a case forming appearance of the mobile terminal, and having a printed circuit board (PCB) therein; and a connection terminal mounted to the case, and configured to electrically connect the PCB to an external device, wherein the connection terminal comprises an external terminal supported by an outer surface of the case; and an internal terminal elastically contacting a terminal of the PCB, connected to the external terminal, and supported by an inner surface of the case.

The external terminal may include a first head portion supported by an outer surface of the case; and a first body portion extending from the first head portion, and inserted into a through hole of the case.

The internal terminal may include a second head portion supported by an inner surface of the case; and a second body portion extending from the second head portion, inserted into the through hole, and coupled to the first body portion.

A coupling groove may be formed at one of the first and second body portions, and the other of the first and second body portions may be insertion-fixed to the coupling groove.

One or more sealing members for hermetically sealing the case may be further provided between the through hole and the external and internal terminals.

The sealing member may include first and second sealing members supported by the case, and the first and second sealing members may be formed to encompass outer circumferential surfaces of the first and second body portions, respectively.

One of the first and second sealing members may be implemented in the form of a cylinder having a height corresponding to a thickness of the case, and may include a protrusion locked by a stopping portion formed on an inner wall of the through hole. The other of the first and second sealing members may be implemented in the form of a ring having one or more parts supported by one of the first and second sealing members.

An elastic contactor elastically contacting the inner terminal may be connected to the PCB. The PCB may be installed at a position spacing from the inner terminal by a predetermined gap. And, the elastic contactor may be implemented as a spring perpendicularly extending from the terminal of the PCB.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

Figure 1:
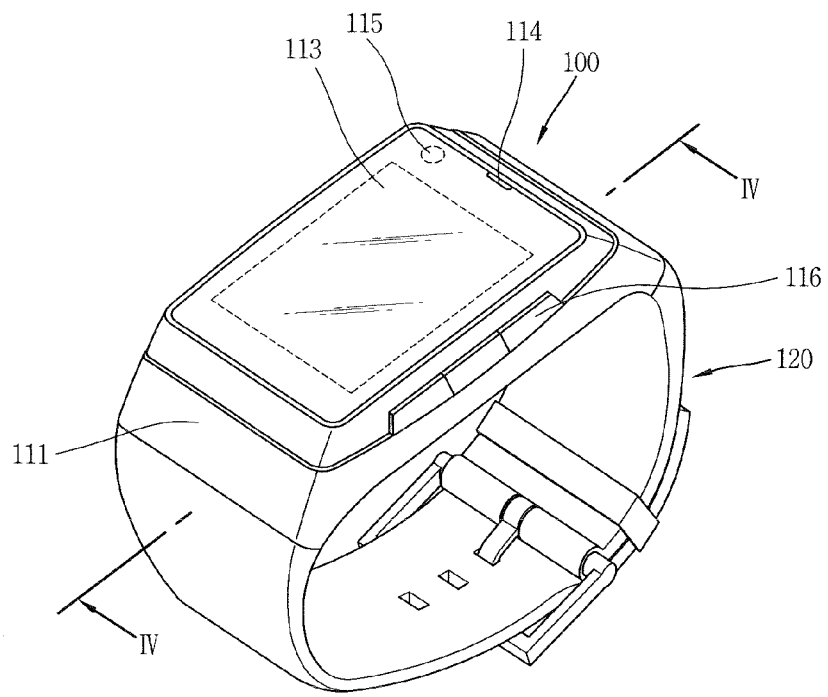
FIG. 1 is a front perspective view of a mobile terminal according to a first embodiment of the present invention.

FIG. 1 is a front perspective view of a mobile terminal according to a first embodiment of the present invention.

The mobile terminal according to a first embodiment of the present invention comprises a body 110 and a band 120. The band 120 is configured so that the body 110 can be mounted to a user's wrist. Accordingly, the mobile terminal is implemented in the form of a watch. This type of mobile terminal may be referred to as a watch type mobile terminal. The mobile terminal according to the present invention is not limited to the watch type mobile terminal, but is applicable to various types such as a bar type, a slide type, and a folder type.

The body 110 is provided with a wireless communication module 181 (refer to FIG. 7) to transmit/receive a wireless signal to/from a mobile communication base station.

A case (or casing, housing, cover, etc.) constituting the external appearance of the 110 may be formed of synthetic resin or metallic material, and each kind of electronic components are mounted to a space inside the case.

The case of the body 110 may consist of a plurality of cases coupled to one another. In the preferred embodiment, a first case 111 and a second case 112 are coupled to each other to constitute a case. The first case 111 is coupled to an upper part of the second case 112.

A display unit 113, an audio output unit 114, an image input unit 115, or a manipulation unit 116a, 116b (refer to FIG. 7) may be arranged at the first case 111 of the body 110.

The display unit 113 occupies most parts of an outer circumferential surface of the case 111. The display unit 113 may be implemented as a liquid crystal display (LCD), a thin film transistor-liquid crystal display (TFT LCD), an organic light emitting diode (OLED), a flexible display, a three dimensional (3D) display, etc. The display unit 113 may be implemented in plurality in number according to a configuration aspect of the mobile terminal.

The display unit 113 may further include a touch sensor configured to receive information input by a user's touch. The touch sensor may be configured to sense a position, an area and a pressure of touch input. The display unit 113 having the touch sensor constitutes a touch screen. In this case, the touch screen is provided with soft keys which allow the user to input numbers or characters in a touch manner.

The audio output unit 114 and the image input unit 115 are arranged at a region adjacent to one end of two ends of the display unit 113.

The audio output unit 114 may be implemented in the form of a speaker module configured to output sound. The speaker module may include a receiver or a loud speaker, etc.

The image input unit 115 may be implemented in the form of a camera configured to capture a user's still or moving images.

An audio input unit 187 (refer to FIG. 7) may be arranged at a region adjacent to another end of the two ends of the display unit 113. The audio input unit 187 may be implemented in the form of a microphone so as to receive a user's voice or another sound. The audio input unit 187 may be arranged on a side surface of the body 110, or inside the case.

The manipulation unit 116 indicates a unit manipulated so as to receive a command to control the operation of the watch type mobile terminal. For instance, the manipulation unit 116 may be implemented as a dome switch or a touch screen configured to receive a command or information input by a user in a push or touch manner. Alternatively, the manipulation unit 116 may be implemented as jog wheels, jog switches, or the like.

The manipulation unit 116 may be set to receive various commands. For instance, the manipulation unit 116 may be receive a command indicating 'START' or 'END', or a command to control a level of sound outputted from the audio output unit 114, or a command to convert the current mode of the display unit 113 into a touch recognition mode.

The band 120 is connected to both sides of the body 100, and is mounted to a user's wrist or arm. The band 120 may be formed of leather, or rubber, or plastic, and may be implemented in the form of multiple layers composed of a plurality of single layers stacked to each other.

The band 120 may be provided with a fastener 151 configured to attach the body 110 to the user's wrist or arm. The fastener 151 may be implemented as a buckle, or a hook having a snap-fit structure. And, the fastener 151 may have an elastic section, or may be formed of an elastic material. In the preferred embodiment, the fastener 151 is implemented as a buckle.

Figure 2:
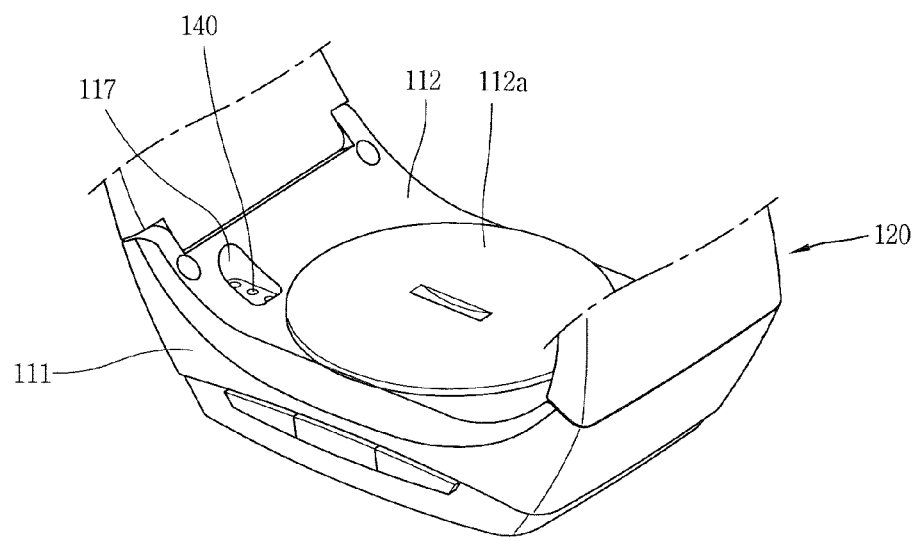
FIG. 2 is a rear perspective view of the mobile terminal of FIG. 1.

FIG. 2 is a rear perspective view of the watch type mobile terminal of FIG. 1.

A cover 112a may be detachably mounted to the second case 112. The first and second cases 111 and 112 are provided with an inner space therebetween where each kind of electronic components are mounted, and the cover 112a is configured to open and close the inner space.

A connection terminal 140 for electrical connection with an external device (e.g., charging device for charging a battery) is arranged at the second case 112. The connection terminal 140 may be arranged at a terminal mounting portion 117 formed on the second case in a recessed manner. However, the connection terminal 140 is not limited to the second case 112, but may be mounted to various positions of the case.

The connection terminal may be arranged at the terminal mounting portion 117 in plurality in number. In this case, each of the connection terminals 140 is configured to be provided with a plurality of functions such as power supply and data transmission.

Figure 3:
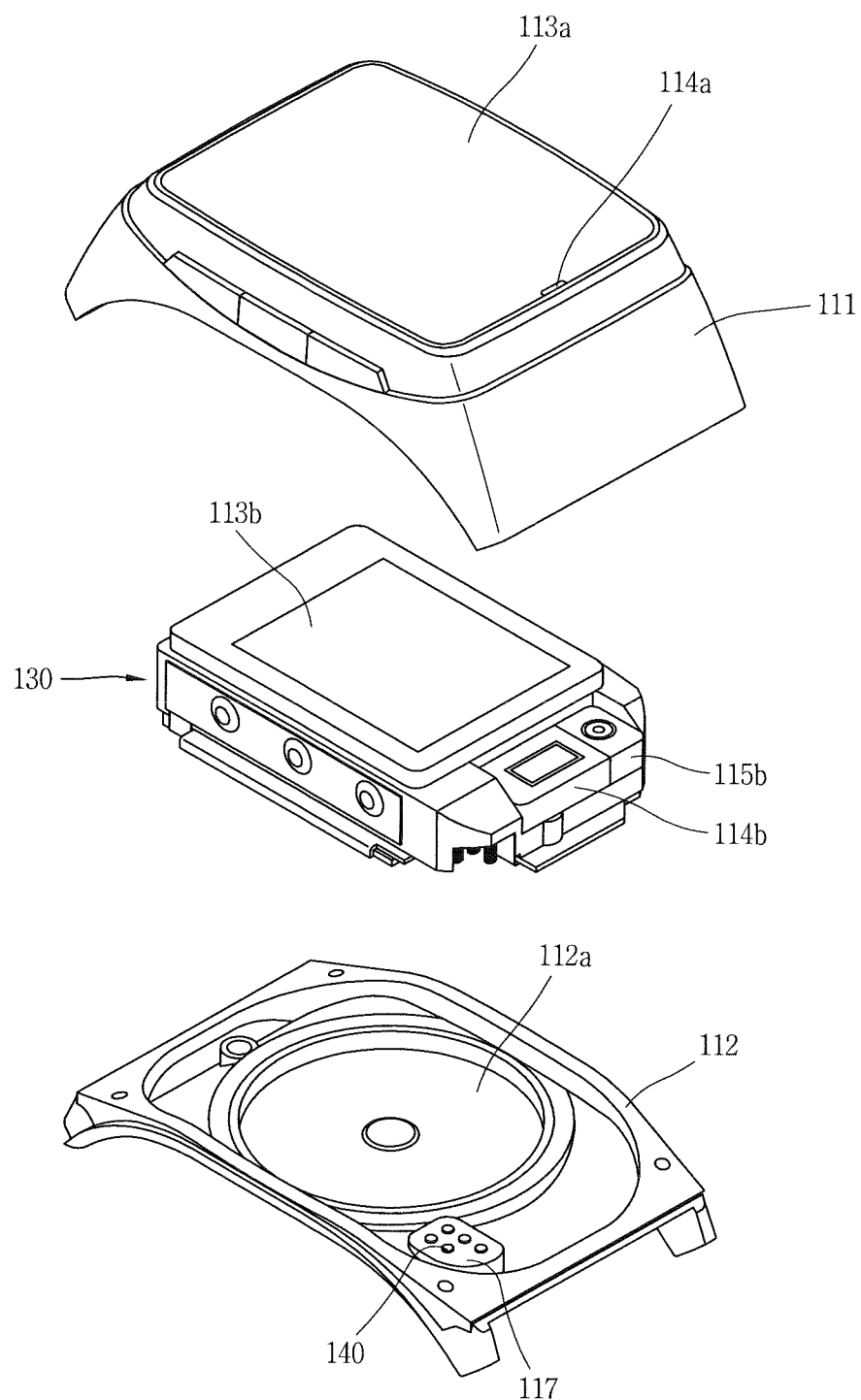
FIG. 3 is a disassembled perspective view of a body of the mobile terminal of FIG. 1.

FIG. 3 is a disassembled perspective view of a body of the mobile terminal of FIG. 1.

Referring to FIG. 3, a transparent window 113a is mounted to one surface of the first case 111. The window 113a may be formed of transmissive synthetic resin or reinforcing glass. The window 113a may further include touch sensing means configured to allow a user to input in a touch manner (including not only direct contact but also approximate touch) while viewing information output to the display 113. The touch sensing means may be implemented as a transmissive sheet including a transparent electrode pattern.

An audio output hole 114a configured to output sound may be formed at one side of the window 113a. And, sound from a speaker module 114b is output to the outside.

A space where electronic components are mounted is formed between the first case 111 and the second case 112, and a supporting frame 130 configured to support or accommodate therein electronic components may be mounted to the inner space.

A display module 113b, a speaker module 114b, a camera module 115b, etc. may be mounted to the supporting frame 130. And, a switch 116b configured to input information in a pressing manner may be mounted to a side surface of the supporting frame 130.

The terminal mounting portion 117 is protruding from an inner surface of the second case 112. That is, the terminal mounting portion 117 is recessed from an outer surface of the second case 112 thus to prevent the connection terminals 140 from being protruding to outside of the body 110. And, the terminal mounting portion 117 is protruding from an inner surface of the second case 112 thus to be easily connected or contacted with other components.

Figure 4:
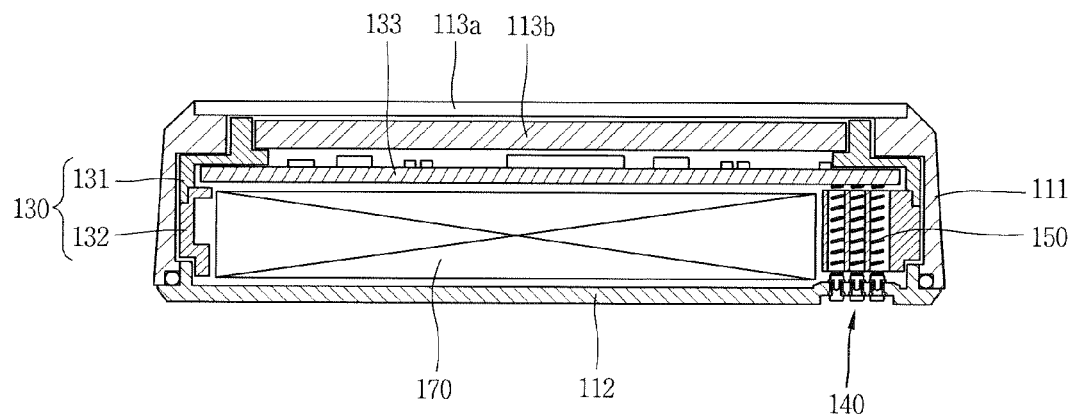
FIG. 4 is a sectional view of the mobile terminal according to a first embodiment of the present invention.
Figure 5:
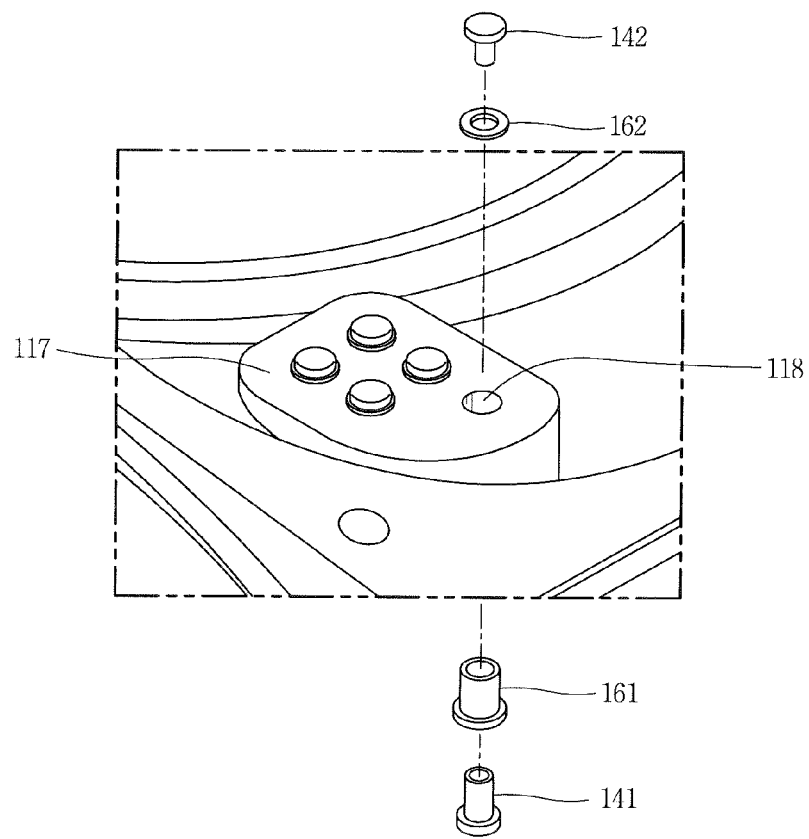
FIG. 5 is a disassembled perspective view of a connection terminal of FIG. 4.
Figure 6:
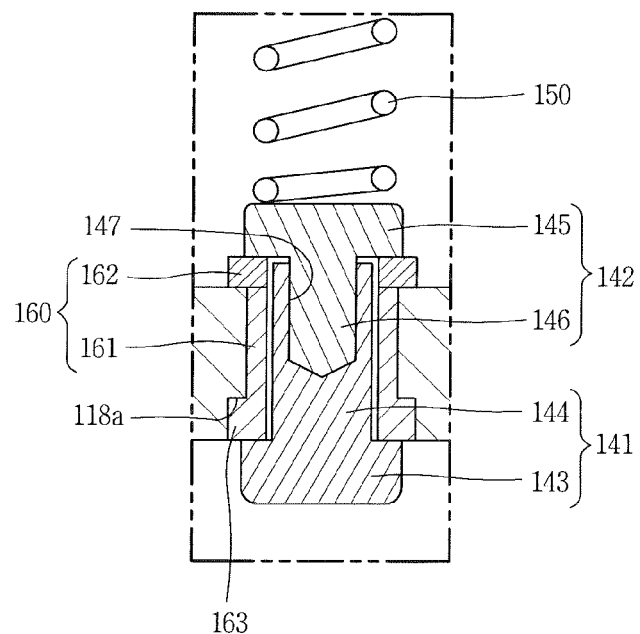
FIG. 6 is a sectional view of the connection terminal of FIG. 4.

FIG. 4 is a sectional view of the mobile terminal according to a first embodiment of the present invention, FIG. 5 is a disassembled perspective view of a connection terminal of FIG. 4, and FIG. 6 is a sectional view of the connection terminal of FIG. 4.

Referring to FIG. 4, the supporting frame 130 may include a first frame 143, and a second frame 132 coupled to the first frame 141.

The display module 113b is mounted to a front surface of the first frame 131. And, a printed circuit board (PCB) 133 is mounted to a space formed between the first frame 131 and the second frame 132.

A wireless communication module configured to process wireless signals, and a process configured to control input/output components are provided at the PCB 133. The PCB 133 may be connected to the connection terminal 140 by connection means 150. The connection means 150 is formed of a conductive material, and serves to elastically connect the terminal of the PCB 133 with the connection terminal 140. Accordingly, the connection means 150 may be referred to as elastic contactors, and will be hereinafter referred to as elastic contactors 150.

In the preferred embodiment, the PCB 133 is spacing from the connection terminal 140 by a predetermined gap, and the elastic contactors 150 are implemented as springs perpendicularly extending from the terminal of the PCB 133. Here, the springs may be implemented as coil springs, and may be adhered to the terminal of the PCB 133 by an adhesive. Alternatively, the springs may be attached to the terminal of the PCB 133 by soldering. The connection terminal 140 and the terminal of the PCB 133 are disposed at positions corresponding to each other in a vertical direction. And, the springs are configured such that the second frame 132 elastically contacts the connection terminal 140 via the through hole.

The second frame 132 is provided with an inner space where a battery 170 for power supply to the PCB 133 may be mounted. In the preferred embodiment, the battery 170 is mounted in the body 110. However, the battery 170 may be detachably mounted to the body 110.

According to the structure, the battery 170 and an electronic component such as a vibrator may be mounted to a space between the connection terminal 140 and the PCB 133. The through hole of the second frame 132 may be formed at a corner region.

Alternatively, the PCB 133 may be positioned below the battery 170. In this case, the terminal of the PCB 133 may directly contact the connection terminal 140. Here, the terminal of the PCB 133 may be implemented as a 'C'-clip, a pogo-pin, etc. for elastic contact with the connection terminal 140.

Referring to FIGS. 5 and 6, the connection terminal 140 includes an external terminal 141 formed of a conductive material and supported by an external surface of the second case 112 (more concretely, the terminal mounting portion 117), and an internal terminal 142 formed of a conductive material and supported by an inner surface of the second case 112.

The external terminal 141 is configured such that one or more parts thereof are exposed to the outside of the second case 112 thus to contact a terminal of an external device. Since the external terminal 141 is supported by an outer surface of the second case 112, motion of the external terminal 141 to the inside of the second case 112 in a pushing manner may be prevented, the motion resulting from a force of the terminal of the external device when the external terminal 141 contacts the terminal of the external device.

The external terminal 141 and the internal terminal 142 are configured to be supported by both surfaces of the second case 112, and to endure a force applied from both sides of the connection terminal 140.

The external terminal 141 and the internal terminal 142 are connected to each other for electrical conductivity, and may be coupled to each other in a physical manner.

Hereinafter, detailed structures of the external terminal 141 and the internal terminal 142 will be explained in more detail.

The external terminal 141 and the internal terminal 142 are insertion-fixed to a through hole 118 penetratingly formed at the terminal mounting portion 117.

The external terminal 141 includes a first head portion 143 supported by an outer surface of the second case 112, and a first body portion 144 extending from the first head portion 143. The first head portion 143 is exposed to outside of the through hole 118, and the first body portion 144 is inserted into the through hole 118.

The internal terminal 142 includes a second head portion 145 supported by an inner surface of the second case 112, and a second body portion 146 extending from the second head portion 145. The second head portion 145 is exposed to outside of the through hole 118, and the second body portion 146 is inserted into the through hole 118. Each of the first head portion 143 and the second head portion 145 has a sectional surface larger than that of the through hole 118 so as to be supported by the second case 112.

The first body portion 144 and the second body portion 146 may be assembled so as to be coupled to each other. The first body portion 144 and the second body portion 146 may be coupled to each other in various manners. For instance, a coupling groove 147 may be formed at one of the first and second body portions 144 and 146, and the other of the first and second body portions 144 and 146 may be insertion-fixed to the coupling groove 147. For this, one of the first and second body portions 144 and 146 where the coupling groove 147 is formed may have a sectional area larger than that of the other of the first and second body portions 144 and 146.

In the preferred embodiment, the coupling groove 147 is formed at the first body portion 144 of the external terminal 141, and the second body portion 146 of the internal terminal 142 is insertion-fixed to the coupling groove 147. Here, the second body portion 146 may be fixed to the coupling groove 147 in a forcible fitting manner.

Owing to the coupled structure between the first and second body portions 144 and 146, the connection terminal 140 may be coupled to the second case 112 more stably. By contacting the first and second head portions 143 and 145 having relatively large areas to terminals 340 of an external charging apparatus 300 and the springs 150, the mobile terminal is electrically connected to the charging apparatus 300 more stably.

One or more sealing members 160 for hermetically sealing the second case 112 may be further provided between the through hole 118 of the second case 112 and the external and internal terminals 141 and 142.

The sealing member 160 may include a first sealing member 161 and a second sealing member 162. The first and second sealing members 161 and 162 are supported by the case, and are formed to encompass outer circumferential surfaces of the first and second body portions 144 and 146. And, some parts of the first and second sealing members 161 and 162 support rear surfaces of the first and second head portions 143 and 145, respectively.

The first and second sealing members 161 and 162 may be formed of a flexible material such as synthetic resin, rubber and silicone. The first and second sealing members 161 and 162 prevent water from being introduced into the body 110 through a gap between the through hole 118 and the external and internal terminals 142 and 141, in order to implement a waterproof function of the mobile terminal.

When the second case 112 is formed of metallic material (conductive material), the first and second sealing members 161 and 162 are formed of non-conductive material, and may serve to insulate between the second case 112 and the external and internal terminals 142 and 141.

One of the first and second sealing members 161 and 162 may be implemented in the form of a cylinder having a height corresponding to a thickness of the second case 112, and the other of the first and second sealing members 161 and 162 may be implemented in the form of a ring having one or more parts supported by one of the first and second sealing members 161 and 162.

In the preferred embodiment, the first sealing member 161 is implemented in the form of a cylinder and the second sealing member 162 is implemented in the form of a ring, and vice versa.

A stopping portion 118a may be formed on an inner wall of the through hole 118, and a protrusion 163 locked by the stopping portion 118a may be formed at the cylinder type of first sealing member 161. The protrusion 163 is formed so as to be stepped from an outer surface of the first sealing member 161.

The first body portion 144 of the external terminal 141 has a length long enough to be extending up to the inside of the second case 112 via the through hole 118. The end of the first body portion 144 is exposed to the outside of the through hole 118.

The first sealing member 161 is configured to encompass an outer circumferential surface of the first body portion 144, the outer circumferential surface inserted into the through hole 118. On the other hand, the second sealing member 162 is configured to encompass an outer circumferential surface of the first body portion 144, the outer circumferential surface exposed to the outside of the through hole 118. Some of the second sealing member 162 are supported by the first sealing member 161, and others are supported by an inner surface of the second case 112.

The structure of the sealing member 160 provides an optimum structure for hermetically sealing the cases 111 and 112, and for preventing motion of the connection terminal 140 in a push manner due to an external or internal force of the mobile terminal. That is, the first and second sealing members 161 and 162 are suitable to distribute a force or a pressure applied from outside or inside of the mobile terminal, in a state supported by the second case 112, or in a reciprocal support state to each other.

Figure 7:
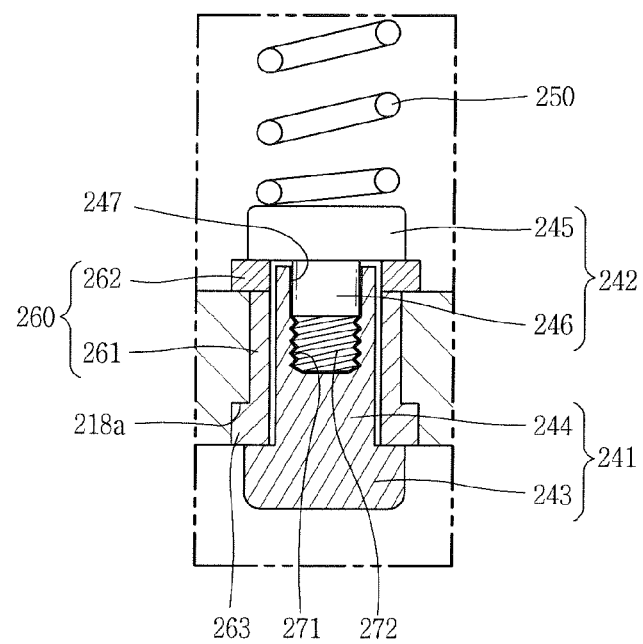
FIG. 7 is a sectional view of a connection terminal according to a second embodiment of the present invention.

FIG. 7 is a sectional view of a connection terminal according to a second embodiment of the present invention. In the second embodiment of the present invention, reference numerals are provided as reference numerals extended from those of the first embodiment, and thus their detailed explanations will be omitted.

In the same manner as the first embodiment, a connection terminal 240 includes an external terminal 241 and an internal terminal 242.

The external terminal 241 includes a first head portion 243 and a first body portion 244, and the internal terminal 242 includes a second head portion 245 and a second body portion 246.

FIG. 7 shows a modification example of a coupling method between the first and second body portions 244 and 246.

In the second embodiment, first and second screw threads 271 and 272 that can be coupled to each other are formed at the first and second body portions 244 and 246. The first screw thread 271 may be formed on an inner wall of a coupling groove 247, and the second screw thread 272 may be formed on an outer circumferential surface of the second body portion 246. An insertion groove 273 for inserting a tool may be formed on at least one of the first and second head portions 243 and 245.

Under the above configuration, the first and second body portions 244 and 246 may be coupled to each other more stably due to the screw coupling method.

Figure 8:
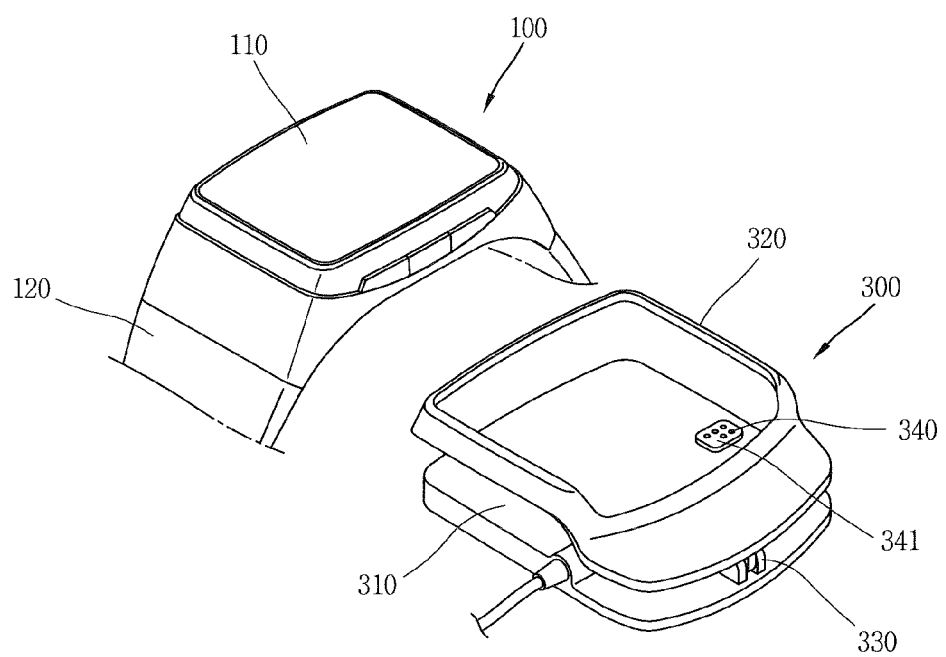
FIG. 8 is a perspective view showing a state that the mobile terminal of the present invention is connected to an external device.

FIG. 8 is a perspective view showing a state that the mobile terminal of the present invention is connected to an external device.

In the second embodiment, a charging apparatus 300 for charging the battery 170 is provided as an external device. The external device may be also implemented as a terminal for data exchange, a computer, etc.

The charging apparatus 300 includes a body 310 and a cover 320 connected to each other by a connection unit 330. The body 310 and the cover 320 are connected to each other so as to form a predetermined space therebetween, and the body 110 of the mobile terminal is mounted to the space.

The connection unit 330 rotatably connects the body 310 and the cover 320 to each other, and provides an elastic force to the body 310 and the cover 320 such that the body 310 and the cover 320 are not spacing from each other by a gap more than a predetermined gap. When the mobile terminal 100 is in a mounted state to the charging apparatus 300, the body 310 and the cover 320 supports the mobile terminal 100 by the elastic force provided from the connection unit 330.

A terminal portion 341 having terminals 340 for connection with the connection terminals 140 of the mobile terminal 100 is formed at the body 310 of the charging apparatus 300. The terminal portion 341 is protruding so as to correspond to the recessed terminal mounting portion 117. The terminal portion 341 and the terminal mounting portion 117 have female and male structures corresponding to each other. The terminal portion 341 is configured so as to be inserted into the terminal mounting portion 117 when the mobile terminal is mounted to the charging apparatus 300.

The terminals 340 of the terminal portion 341 have the number and positions corresponding to the connection terminals 140 of the mobile terminal, and are configured to contact the mobile terminal 100 when the mobile terminal 100 is mounted to the charging apparatus 300. The terminals 340 may have a structure to elastically contact the connection terminals 140, e.g., pogo-pins and C-clips. As aforementioned, the external terminal 141 of the present invention is supported by an outer surface of the second case 112. This may prevent the connection terminals 140 from being moved in a push manner when the terminals 340 of the charging apparatus 300 elastically contact the connection terminals 140.

Figure 9:
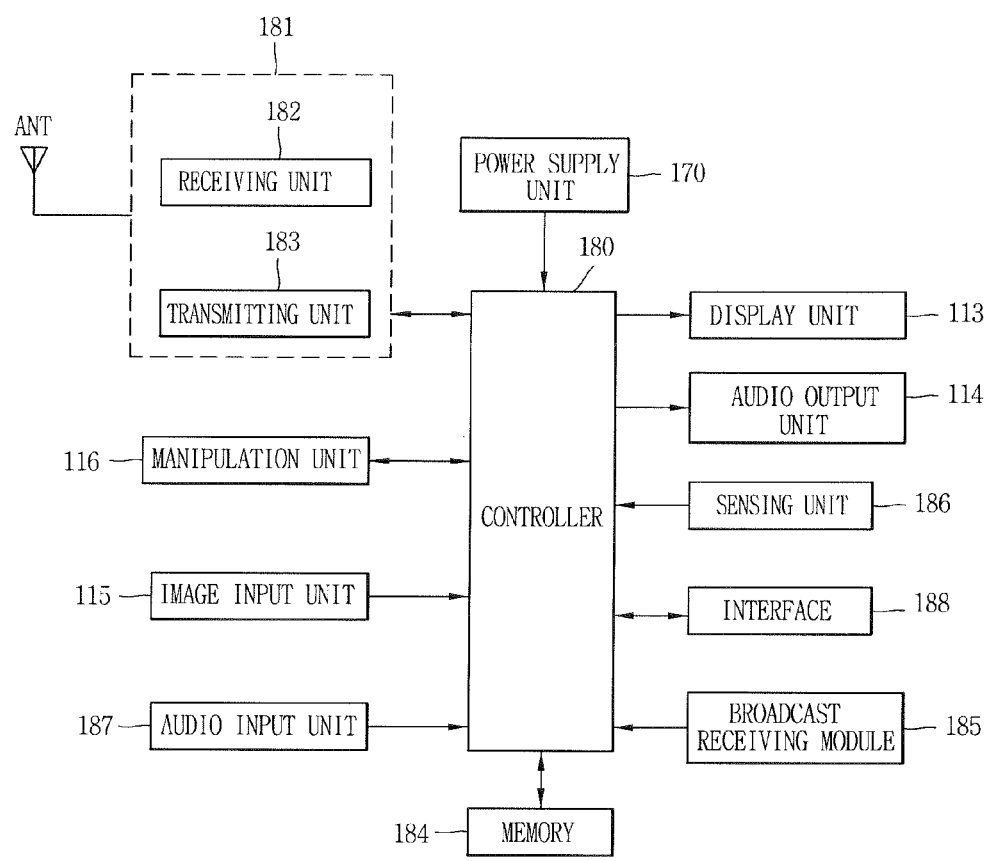
FIG. 9 is a block diagram of the mobile terminal according to the present invention.

FIG. 9 is a block diagram of a mobile terminal according to an exemplary embodiment of the present invention.

Referring to FIG. 9, the mobile terminal according to an exemplary embodiment of the present invention comprises a display unit 113, an audio output unit 114, an image input unit 115, a manipulation unit 116a and 116b, a power supply unit 170, a controller 180, a wireless communication module 181, a memory 184, a broadcast receiving module 185, a sensing unit 186, an audio input unit 187, and an interface unit 188.

The controller 180 typically controls the overall operations of the mobile terminal. For example, the controller 180 performs the control and processing associated with telephony calls, data communications, video calls, and the like.

The wireless communication module 181 transmits/receives a wireless signal to/from a mobile communication base station through an antenna. For instance, the wireless communication module 181 performs transmission/reception of voice data, text data, image data, and control data under control of the controller 180. The wireless communication module 181 includes a transmitting unit 183 configured to transmit a signal by modulation, and a receiving unit 182 configured to demodulate a received signal.

The manipulation unit 116 provides, to the controller 180, data received by a user's key input so as to control the operation of the mobile terminal. The manipulation unit 116A and 116B may be implemented as a dome switch, a touch screen, a touchpad (e.g., static pressure/capacitance), a jog wheel or a jog switch.

The image input unit 115 is configured to process image frames of still or moving images obtained by image sensors in a video call mode or a capturing mode. The processed image frames may be displayed on the display unit 113 after being converted into image data that can be displayed on the display unit 113.

The image frames processed by the image input unit 115 may be stored in a memory 184 or transmitted to the exterior via the wireless communication module 181.

The audio input unit 187 may receive an external audio signal while the mobile terminal is in a particular mode, such as a phone call mode, a recording mode, a voice recognition mode, or the like. This audio signal is processed into electric voice data. The processed voice data is converted for output into a format transmittable to a mobile communication base station via the wireless communication module 181 in case of the phone call mode. In case of the recording mode, the processed voice data is output so as to be stored in the memory 184.

The audio input unit 187 may include assorted noise removing algorithms to remove noise generated in the course of receiving the external audio signal.

The display unit 113 may output information processed in the mobile terminal. For example, when the mobile terminal is operating in a phone call mode, the display unit 113 provides, under control of the controller 180, a User Interface (UI) or a Graphic User Interface (GUI) which includes information associated with to the call. As another example, if the mobile terminal is in a video call mode or a capturing mode, the display unit 113 may additionally or alternatively display images captured and/or received under control of the controller 180, or UI or GUI. When the display unit 113 includes a touch screen, it may be used as an input device as well as an output device.

The audio output unit 114 may output audio data received from the wireless communication module 181 or stored in the memory 184, in a call-receiving mode, a call-placing mode, a recording mode, a voice recognition mode, a broadcast reception mode, and so on.

The audio output unit 114 may output audio signals relating to functions performed in the mobile terminal (e.g., sound alarming a call received or a message received, and so on).

The sensing unit 130 provides a sensing signal to control the operation of the mobile terminal by sensing the current status of the mobile terminal, such as an open/closed status of the mobile terminal, the position of the mobile terminal, and a presence or absence of user contact with the mobile terminal. Furthermore, the sensing unit 130 may sense whether power has been supplied by the power supply unit 170, or whether or not the interface unit 188 has been coupled to an external device, etc.

The interface unit 188 is used as a communication link (or passage, path, etc.) through which the mobile terminal can exchange data or the like with an external device. For example, the interface unit 188 may be implemented in the form of a connection port for connecting an earphone to the mobile terminal via a wire or wireless means, a port for short-range communications (e.g., an Infrared Data Association (IrDA) port, a Bluetooth™ port, a wireless LAN port, etc.), power supply ports for providing power to the mobile terminal, or the like. Also, the interface unit 188 may be a card socket for accommodating a SIM (Subscriber Identification Module) card or a UIM (User Identity Module) card, or an external card such as a memory card for storing information.

The interface 188 is configured to transmit data or power received from an external device to each component of the mobile terminal, or configured to transmit data inside the mobile terminal to an external device.

The memory 184 may store programs to operate the controller 180, or may temporarily store input/output data (e.g., phonebook, messages, still images, moving images, etc.). The memory 184 may store programs to control the operation of the mobile terminal according to the present invention.

The memory 184 may be implemented using any type or combination of suitable memory or storage devices including a flash memory type, a hard disk type, a card type (SD or XD memory), random access memory (RAM), read-only memory (ROM), etc.

The broadcast receiving module 185 receives broadcasting signals transmitted through satellite waves or terrestrial waves, etc. Then, the broadcast receiving module 185 converts the received signal into broadcasting data that can be output to the audio output unit 114 and the display unit 113, thereby outputting the converted signal to the controller 180. Also, the broadcast receiving module 185 receives additional data relating to broadcasting, such as Electric Program Guide (EPG), and a channel list. The broadcasting signals or additional data converted by the broadcast receiving module 185 may be stored in the memory 184.

The power supply unit 170 is configured to receive external or internal power and to supply the received power to each component of the mobile terminal under control of the controller 180. The power supply unit 170 may be implemented as a rechargeable battery.

As aforementioned, the internal and external terminals connected to each other are configured to resist force generated from both sides thereof, through the structure of the connection terminal supported by both surfaces of the case. This may provide enhanced reliability in physical coupling between the connection terminal and the case.

Furthermore, the first and second head portions having relatively large areas are made to contact the external and internal terminals, thereby providing more stable electric connection between the mobile terminal and the charging apparatus.

Furthermore, the sealing member provides an excellent waterproofing effect to the connection terminal having the internal and external terminals coupled to each other.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a case forming appearance of the mobile terminal, and having a printed circuit board (PCB) therein; and
a connection terminal mounted to the case, and configured to electrically connect the PCB to an external device,
wherein the connection terminal comprises:
an external terminal configured such that part thereof is exposed outside the case to contact a terminal of an external device, the external terminal being supported by an outer surface of the case to be prevented from moving even if the external terminal contacts the terminal of the external device; and
an internal terminal elastically contacting a terminal of the PCB, connected to the external terminal, and supported by an inner surface of the case, and
wherein one or more sealing members for hermetically sealing the case are further provided between the through hole and the external and internal terminals, the sealing members being formed of a non-conductive material and configured to allow the external and internal terminals to be spaced from the case such that the sealing members serve to insulate between the case and the external and internal terminals even though the case is formed of metallic material.

2. The mobile terminal of claim 1, wherein the external terminal comprises:
a first head portion supported by an outer surface of the case; and
a first body portion extending from the first head portion, and inserted into a through hole of the case.

3. The mobile terminal of claim 2, wherein the internal terminal comprises:
a second head portion supported by an inner surface of the case; and
a second body portion extending from the second head portion, inserted into the through hole, and coupled to the first body portion.

4. The mobile terminal of claim 3, wherein a coupling groove is formed at one of the first and second body portions, and the other of the first and second body portions is insertion-fixed to the coupling groove.

5. The mobile terminal of claim 3, wherein first and second screw threads that can be coupled to each other are formed at the first and second body portions.

6. The mobile terminal of claim 1, wherein the sealing member comprises first and second sealing members supported by the case, and formed to encompass outer circumferential surfaces of the first and second body portions, respectively.

7. The mobile terminal of claim 6, wherein the first and second sealing members support rear surfaces of the first and second head portions, respectively.

8. The mobile terminal of claim 6, wherein one of the first and second sealing members is implemented in the form of a cylinder having a height corresponding to a thickness of the case, and includes a protrusion locked by a stopping portion formed on an inner wall of the through hole.

9. The mobile terminal of claim 8, wherein the other of the first and second sealing members is implemented in the form of a ring having one or more parts supported by one of the first and second sealing members.

10. The mobile terminal of claim 1, wherein an elastic contactor elastically contacting the inner terminal is connected to the PCB.

11. The mobile terminal of claim 10, wherein the PCB is installed at a position spacing from the inner terminal by a predetermined gap, and
wherein the elastic contactor is implemented as a spring perpendicularly extending from the terminal of the PCB.

12. The mobile terminal of claim 11, wherein a mounting space configured to mount electronic components therein is disposed between the PCB and the connection terminal.

13. The mobile terminal of claim 10, further comprising a supporting frame configured to support the PCB, and having a through hole for passing the elastic contactor therethrough.

14. The mobile terminal of claim 1, wherein a battery for supplying power to the PCB is mounted to inside of the case, and
wherein the external device is implemented as a charging apparatus configured to charge the battery.

15. The mobile terminal of claim 1, further comprising bands disposed at both ends of the case for mounting onto a user's wrist.

16. A mobile terminal, comprising:
a case forming appearance of the mobile terminal, and having a printed circuit board (PCB) therein;
a connection terminal mounted to the case, and configured to electrically connect the PCB to an external device; and
an elastic contactor connected to a terminal of the PCB, and elastically contacting the connection terminal,
wherein the connection terminal comprises:
an external terminal configured such that part thereof is exposed outside the case to contact a terminal of an external device, the external terminal being supported by an outer surface of the case to be prevented from moving even if the external terminal contacts the terminal of the external device; and
an internal terminal elastically contacting the elastic contactor, connected to the external terminal, and supported by an inner surface of the case, and
wherein one or more sealing members for hermetically sealing the case are further provided between the through hole and the external and internal terminals, the sealing members being formed of a non-conductive material and configured to allow the external and internal terminals to be spaced from the case such that the sealing members serve to insulate between the case and the external and internal terminals even though the case is formed of metallic material.

17. The mobile terminal of claim 16, wherein the external terminal comprises:
a first head portion supported by an outer surface of the case; and
a first body portion extending from the first head portion, and inserted into a through hole of the case, and wherein the internal terminal comprises:
a second head portion supported by an inner surface of the case; and
a second body portion extending from the second head portion, inserted into the through hole, and coupled to the first body portion.

18. The mobile terminal of claim 17, wherein a coupling groove is formed at one of the first and second body portions, and the other of the first and second body portions is insertion-fixed to the coupling groove.

* * * * *